Figure 1:
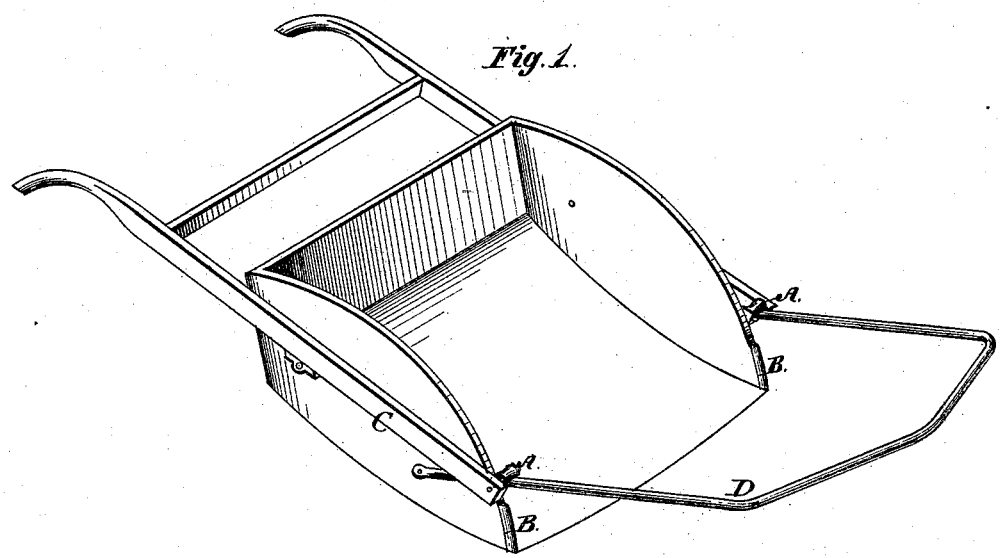
Figure 2:
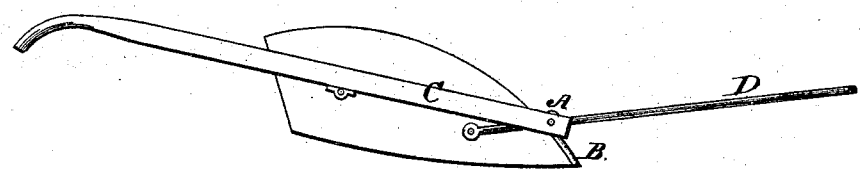
Figure 3:
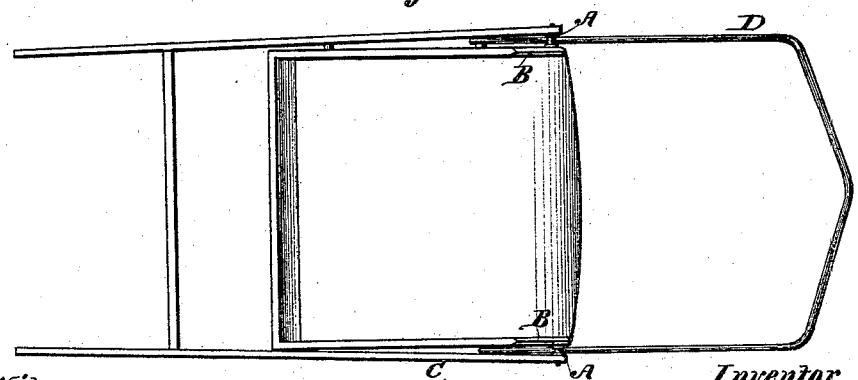

R. D. LOUDON.
ROAD-SCRAPER.

No. 174,081. Patented Feb. 29, 1876.

UNITED STATES PATENT OFFICE.

RODNEY D. LOUDON, OF WESLEY, ILLINOIS.

IMPROVEMENT IN ROAD-SCRAPERS.

Specification forming part of Letters Patent No. 174,081, dated February 29, 1876; application filed July 10, 1875.

*To all whom it may concern:*

Be it known that I, RODNEY D. LOUDON, of Wesley, in the county of Will and State of Illinois, have invented a new Improvement in Road-Scrapers, or scrapers for removing earth; and I do hereby declare that the following is a full and exact description thereof, reference being had to the accompanying drawing, and to the letters of reference thereon marked.

The nature of the invention consists in attaching rollers to the handles C of the scraper shown in said drawing accompanying, and marked A A, so that the rollers will roll upon the bail D, by which said scraper is drawn, instead of sliding upon iron in dumping said scraper. The rollers are to be made of cast-iron or other metallic substance.

The said improvement is especially intended to apply to a scraper patented by one James Williams, of Kent, Newton county, Indiana, to whom Letters Patent were issued November 19, A. D. 1872, and the rollers and cutters above mentioned are the only things claimed to be new.

What I claim as my invention and as new is—

The combination, with the handles C and bail D of a scraper, of the rollers A A, which permit the ends of the handles to roll along the bail in dumping, substantially as specified.

RODNEY D. LOUDON.

Witnesses:
JAMES L. YOUNG,
JOHN P. RANSOM.